006
United States Patent
Stevenson

[15] 3,659,454
[45] May 2, 1972

[54] FABRIC STIFFNESS TESTING APPARATUS
[72] Inventor: Jack R. Stevenson, Winnsboro, S.C.
[73] Assignee: Uniroyal, Inc., New York, N.Y.
[22] Filed: May 1, 1970
[21] Appl. No.: 33,600

[52] U.S. Cl. .................................73/103, 73/100, 73/159
[51] Int. Cl. ..............................................G01n 3/00
[58] Field of Search.................73/100, 159, 160, 103, 88, 73/89

[56] References Cited

UNITED STATES PATENTS 3,394,384   7/1968   Hines.....................................73/89 X
3,245,253   4/1966   Gruber....................................73/91

OTHER PUBLICATIONS

" Jigs & Fixtures" p.8, publ. by Instron Engr. Corp., of Canton, Mass.–April 3, 1963.

Primary Examiner—Richard C. Queisser
Assistant Examiner—Marvin Smollar
Attorney—Jack Posin

[57] ABSTRACT

An apparatus for testing the stiffness of fabrics, comprising a testing machine fitted with a pair of linked, mutually orthogonal jaw members which support and load a fabric specimen therein, the machine providing a record of the force-deflection behavior of the specimen under test.

The foregoing abstract is neither intended to define the invention disclosed in the specification, nor is it intended to be limiting as to the scope of the invention in any way.

7 Claims, 4 Drawing Figures

PATENTED MAY 2 1972

INVENTOR.
Jack R. Stevenson
BY
Jack Posin
ATTORNEY

INVENTOR.
Jack R. Stevenson
BY
Jack Rosin
ATTORNEY

3,659,454

FABRIC STIFFNESS TESTING APPARATUS

BACKGROUND OF THE INVENTION

The invention here presented relates to apparatus for testing the stiffness of fabrics and, more particularly, it relates to an apparatus which supports and loads a fabric specimen and provides a record of the force-deflection behavior of the specimen under test.

Heretofore, conventional cantilever beam testing machines have been used to determine the stiffness of fabrics, measured as the force required to bend a freely hanging specimen through a given deflection. Tests of this type have yielded accurate results for low denier processed fabrics. However, these tests do not maintain the requisite accuracy when the test specimens include giant cords or comprise multiple plies of calendered fabric. Nor are these machines sufficiently flexible to measure the wide range of specimens to be tested in bending.

In the manufacture of tires, for example, the stiffness of tire plies is a major factor to be considered due to the fact that the marginal portions of the plies are wrapped around bead wire bundles by short radius turns. As tire ply stiffness has increased in recent years, the incidence of tire failure due to separation of the plies in the bead areas has become more prevalent. This is attributable, in part, to the tendency of the stiff plies to pull loose in the bead areas prior to curing, with the result that air pockets form in the bead areas of the uncured tire. This condition has been aggravated by the fact that, heretofore, it has been difficult to make accurate measurements of tire fabric stiffness so as to facilitate removal of excessively stiff fabrics from use in tire production runs. Moreover, excessive variation in the stiffness of tire fabrics has adversely affected production rates of tires on mechanized tire building equipment. It is, therefore, desirable to accurately determine the stiffness of tire components prior to their introduction into the building process.

Accordingly it is a primary object of the present invention to provide a testing device which will overcome the aforesaid disadvantages.

A further object of this invention is to provide a new test fixture, which may be used with conventional testing machines, for holding a test specimen and applying a test load to the specimen.

A still further object of this invention is to provide an improved apparatus for producing a record of the force-deflection behavior of a test specimen during flexural bending of the specimen.

Another object of this invention is to provide an improved, economical testing device for determining the stiffness of various constituent components of tires.

Further objects and advantages of this invention will become apparent as the following description proceeds.

SUMMARY OF THE INVENTION

Briefly stated, and in accordance with one embodiment of this invention, there is provided in a conventional testing machine two generally planar, mutually orthogonal, linked jaw members for supporting and applying a test load to a test specimen. Both jaw members are essentially rectangular frames which include upper and lower cross bars therein. The lower cross bar of the upper jaw member has an opening therein which is spanned by the specimen to be tested. The upper cross bar of the upper jaw member is supported by the tension member or stationary member of the testing machine, whereas the lower cross bar of the lower jaw member is mounted upon the adjustable crosshead, or movable member, of the testing machine. The frame of the upper jaw member is positioned substantially normal to and in a linked relationship with the frame of the lower jaw member, so that when a test specimen is placed on the lower cross bar of the upper jaw member and the lower jaw member is moved in a downwardly direction, the top cross bar of the lower jaw member will contact the test specimen and apply a force which deflects the specimen. Suitable sensing and display means are employed in the testing machine to display the force-deflection relationship of the sample under test.

BRIEF DESCRIPTION OF THE DRAWINGS

While the specification concludes with claims particularly pointing out and distinctly claiming the subject matter of this invention, it is believed that the invention will be better understood from the following description, taken in conjunction with the accompanying drawings, in which:

DESCRIPTION OF PREFERRED EMBODIMENT

Figure 1:
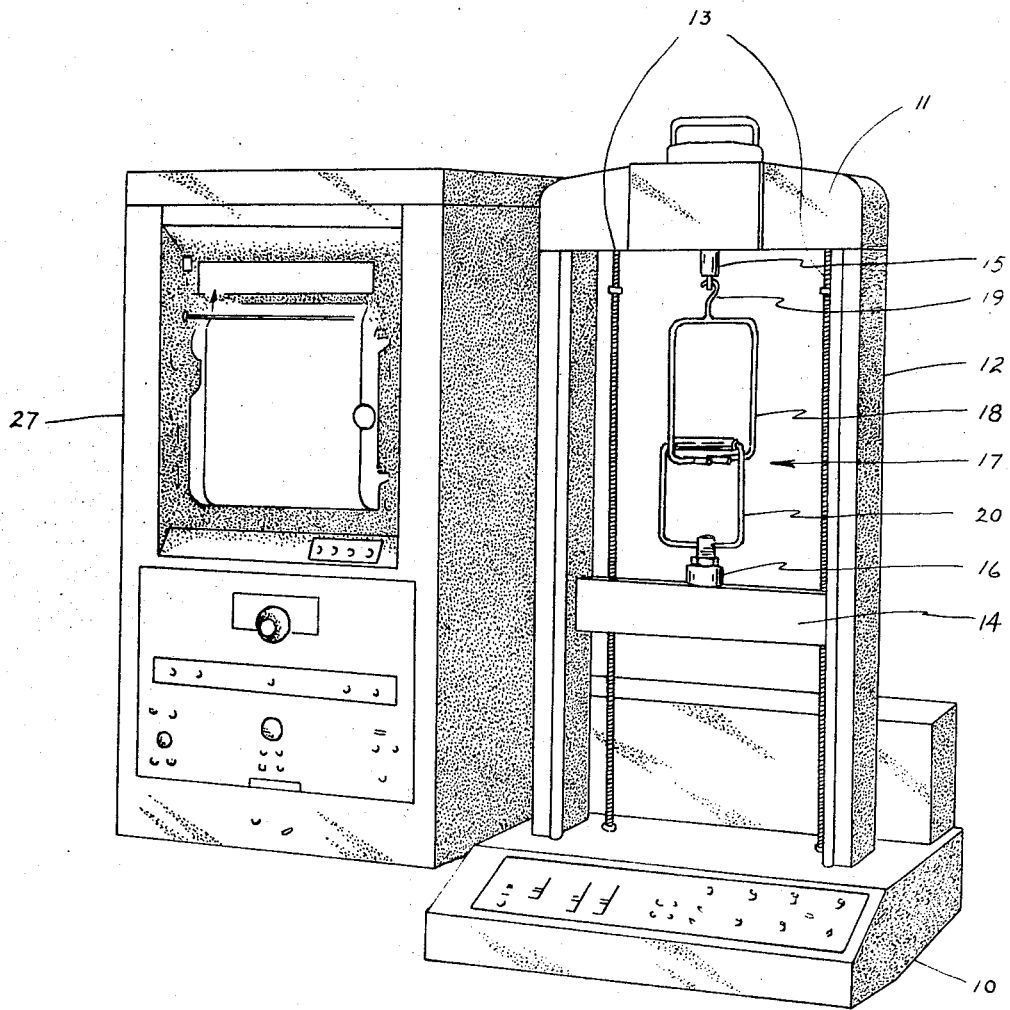
FIG. 1 is a perspective view of an apparatus for testing fabrics constructed in accordance with this invention.

To illustrate the invention, a standard testing machine, for example Table Model TM, made by Instron Corporation of 2500 Washington Street, Canton, Massachusetts, is shown in FIG. 1. The machine comprises a table 10 which supports a tension crosshead member 11 by means of a pair of columns 12. Lead screws 13, mounted parallel to the columns 12 between the table 10 and tension crosshead member 11, are employed for driving an adjustable crosshead member 14 in either an upward or downward direction. The tension crosshead member 11 is stationary, whereas the adjustable crosshead member 14 is movable in a vertical direction. A grip 15 is mounted at the approximate midpoint of the tension crosshead member 11; similarly an adapter 16 is fixedly mounted on the adjustable crosshead member 14. A test fixture, shown generally at 17, for supporting and applying a test load to a test specimen is mounted to both the grip 15 and the adapter 16.

Figure 2:
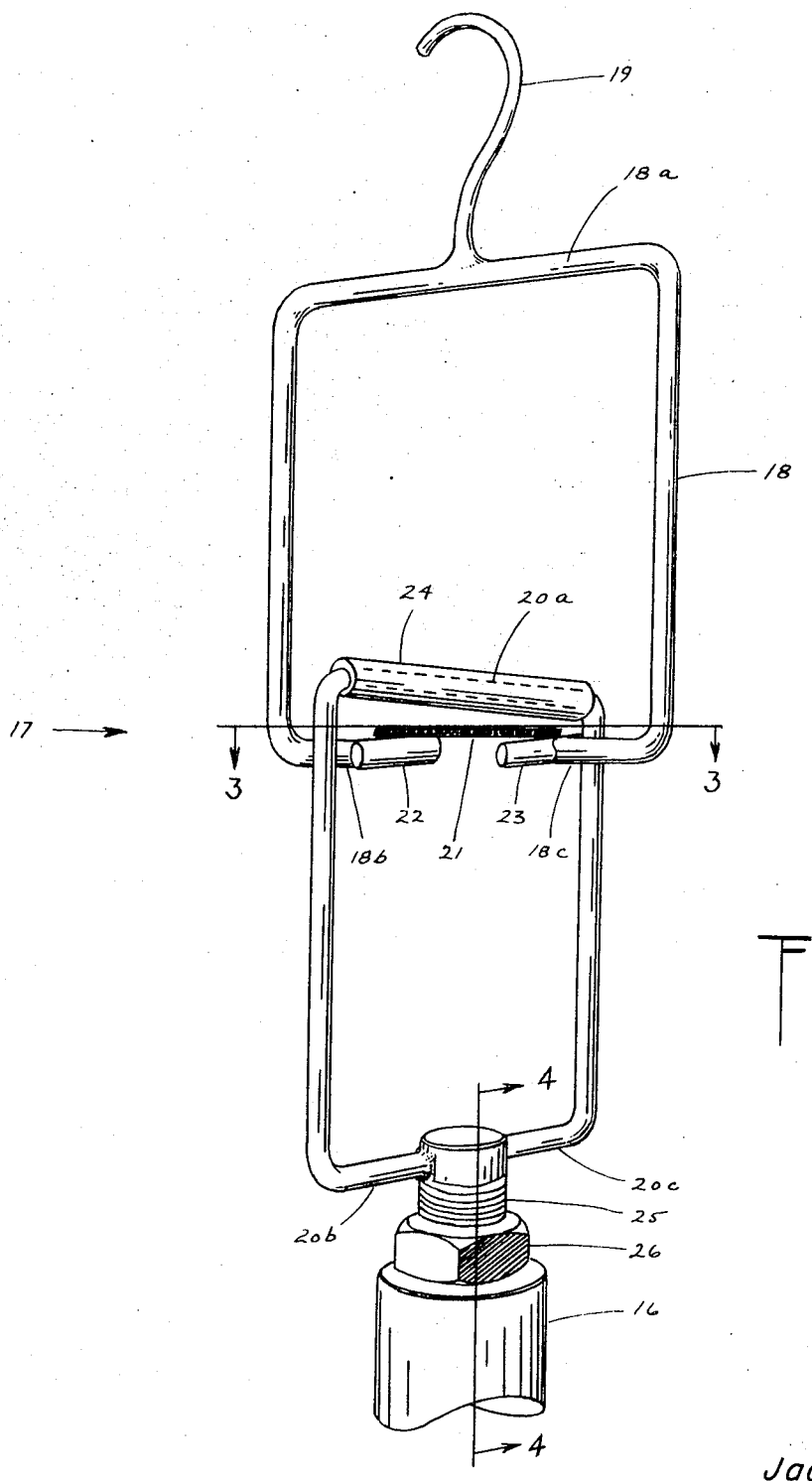
FIG. 2 is a perspective view of a pair of linked jaw members used in the FIG. 1 apparatus for supporting and applying a test load to a test specimen.
Figure 3:
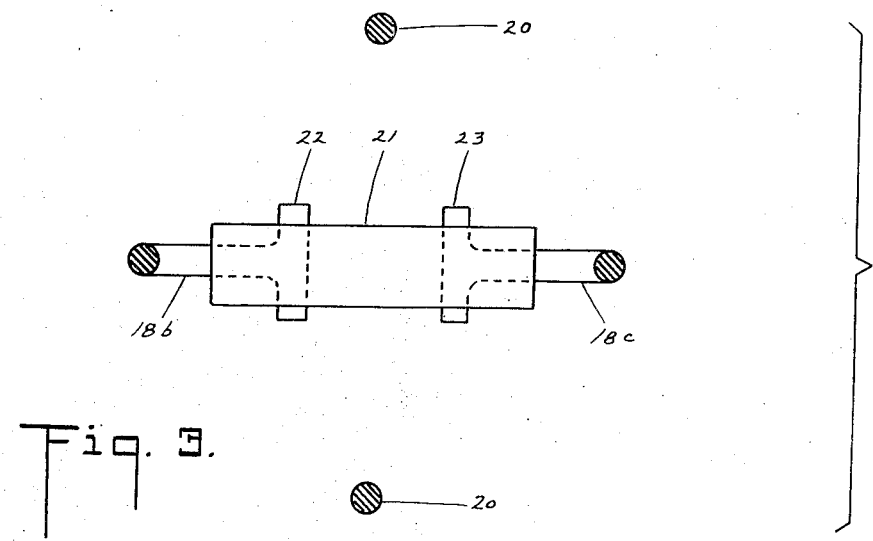
FIG. 3 is an enlarged sectional plan view taken along the line 3—3 of FIG. 2.
Figure 4:
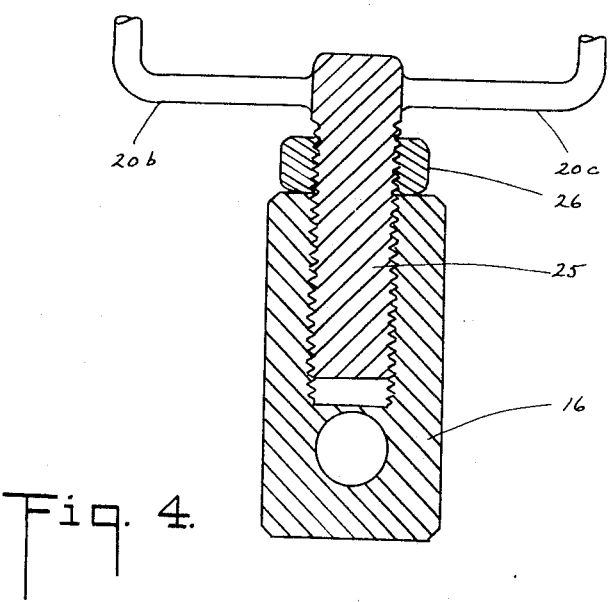
FIG. 4 is an enlarged sectional elevational view taken along the line 4—4 of FIG. 2.

Referring now to FIGS. 2–4, the test fixture 17 has there been illustrated in greater detail. The test fixture 17 comprises generally rectangular upper and lower metallic jaw members 18 and 20, respectively, which are orthogonally disposed to one another. The upper jaw member 18 includes an upper cross bar 18a which has fastened thereto a hook 19 that is adapted to engage the grip 15, as shown in FIG. 1, of the stationary tension crosshead member 11. Upper jaw member 18 also includes a lower cross bar which has a segment thereof missing so as to form two cross bar portions 18b and 18c. In order to provide a suitable support for a test specimen, shown generally at 21 support members 22 and 23 are brazed or otherwise fastened to the respective free ends of the cross bar portions 18b and 18c. The support members 22 and 23 are preferably disposed at right angles to the plane of upper jaw member 18.

The lower jaw member 20 includes an upper cross bar 20a and a lower cross bar which has a segment thereof missing so as to form two cross bar portions 20b and 20c. A tubular member is telescoped over the upper cross bar 20a. A threaded member 25 is brazed or otherwise fastened to the respective free ends of the cross bar portions 20b and 20c. The threaded member 25, which threadedly engages the adapter 16, is locked to the adapter 16 by means of a lock nut 26. Prior to initiation of a test cycle of the machine, the lower jaw member 20 is positioned such that the tube 24 is just above and out of contact with the test specimen 21, and the respective planes formed by the jaw members 18 and 20 are normal to one another, as shown in FIG. 2.

Upon actuation of the machine to initiate a test cycle, the adjustable crosshead member 14, as shown in FIG. 1, is moved in a downward direction whereupon tube 24 contacts the test specimen 21 and applies a load in substantially the center of the test specimen 21. This loading produces tensile stresses in the test specimen below the neutral plane and compressive stresses above the neutral plane. As the adjustable crosshead member 14 continues to descend, the load applied to the test specimen 21 increases and the deflection of the test specimen increases. Suitable sensing means (not shown), which are conventionally provided in standard testing machines of the type shown in FIG. 1, generate signals proportional to the bending force exerted by the lower jaw member 20 on the test specimen 21 and proportional to the vertical travel of the adjustable crosshead member 14. A conventional recording device 27, which forms a part of the conventional test machine, maintains a continuous plot of the force applied to the test specimen 21 versus the corresponding deflection of the specimen. This record provides a measurement of the stiffness of the test specimen.

It is clear from the foregoing description that the herein described testing apparatus achieves the objectives of the present invention. The apparatus is capable of determining the stiffness of a wide range of fabric specimens extending from low denier processed fabrics to specimens which include giant cords or comprise multiple plies of calendered fabric. The test fixture is adapted to be mounted in a conventional testing machine and supports a fabric to be tested at both ends, permitting a load to be applied to the midpoint of the fabric. A record of the force applied to the fabric versus the deflection of the fabric may be maintained continuously by conventional peripheral equipment cooperating with the standard testing machine. The test fixture is economical and, when used in conjunction with a conventional testing machine and recorder, yields superior results to the heretofore utilized means for determining the stiffness of fabric specimens.

While a particular embodiment of this invention has been shown and described, it will be obvious to those skilled in the art that various changes and modifications may be made without departing from this invention in its broader aspects, and it is, therefore, aimed in the appended claims to cover all such changes and modifications as fall within the true spirit and scope of this invention.

Having thus described my invention, what I claim and desire to protect by Letters Patent is:

1. In a fabric testing apparatus of the type having a stationary member, a movable member, means for translating the movable member with respect to the stationary member, and means for sensing and displaying the force versus deflection characteristics of the fabric specimen, the improvement comprising: first and second generally planar, linked, jaw members, one of said jaw members being connected to said stationary member, the other of said jaw members being connected to said movable member, the plane formed by one of said jaw members intersecting and being substantially normal to the plane formed by the other of said jaw members, one of said jaw members being adapted to support the fabric specimen, said specimen supporting jaw member comprising first and second pairs of spaced opposed sides, said sides being joined to one another to form a hollow, generally rectangular frame, one of said sides being discontinuous in the mid-portion thereof, said discontinuous side having at each of the free ends adjacent the discontinuous portion thereof a means to support the fabric specimen, the other of said jaw members being adapted to apply a load to the fabric specimen.

2. A testing apparatus as recited in claim 1, further including means for connecting said specimen supporting jaw member to said stationary member, said connecting means comprising a hook secured to substantially the midpoint of the side of said jaw member which is opposite to said discontinuous side.

3. A testing apparatus as recited in claim 1, in which said supporting means comprises a pair of substantially parallel spaced flat members affixed to the free ends of said discontinuous side, said flat members being disposed normal to the plane of said rectangular frame.

4. A testing apparatus as recited in claim 1, in which said load applying jaw member comprises: first and second pairs of spaced opposed sides, said sides being joined to one another to form a hollow substantially rectangular frame; means for mounting said jaw member to said movable member; and means for applying a load to the fabric specimen.

5. A testing apparatus as recited in claim 4, in which said loading means comprises a tube telescoped over one of said sides.

6. A testing apparatus as recited in claim 4, in which one of said sides is discontinuous in the midportion thereof and in which said mounting means comprises: an externally threaded member affixed to the free ends of said discontinuous side; an internally threaded coupling member for receiving said externally threaded member; and a lock nut cooperable with said externally threaded member and said coupling member, said lock nut being adapted to press into said coupling member so as to apply a force to said coupling member for locking it to said externally threaded member.

7. A testing apparatus as recited in claim 1, in which said jaw members are made of metal.

* * * * *